United States Patent Office 2,887,905
Patented May 26, 1959

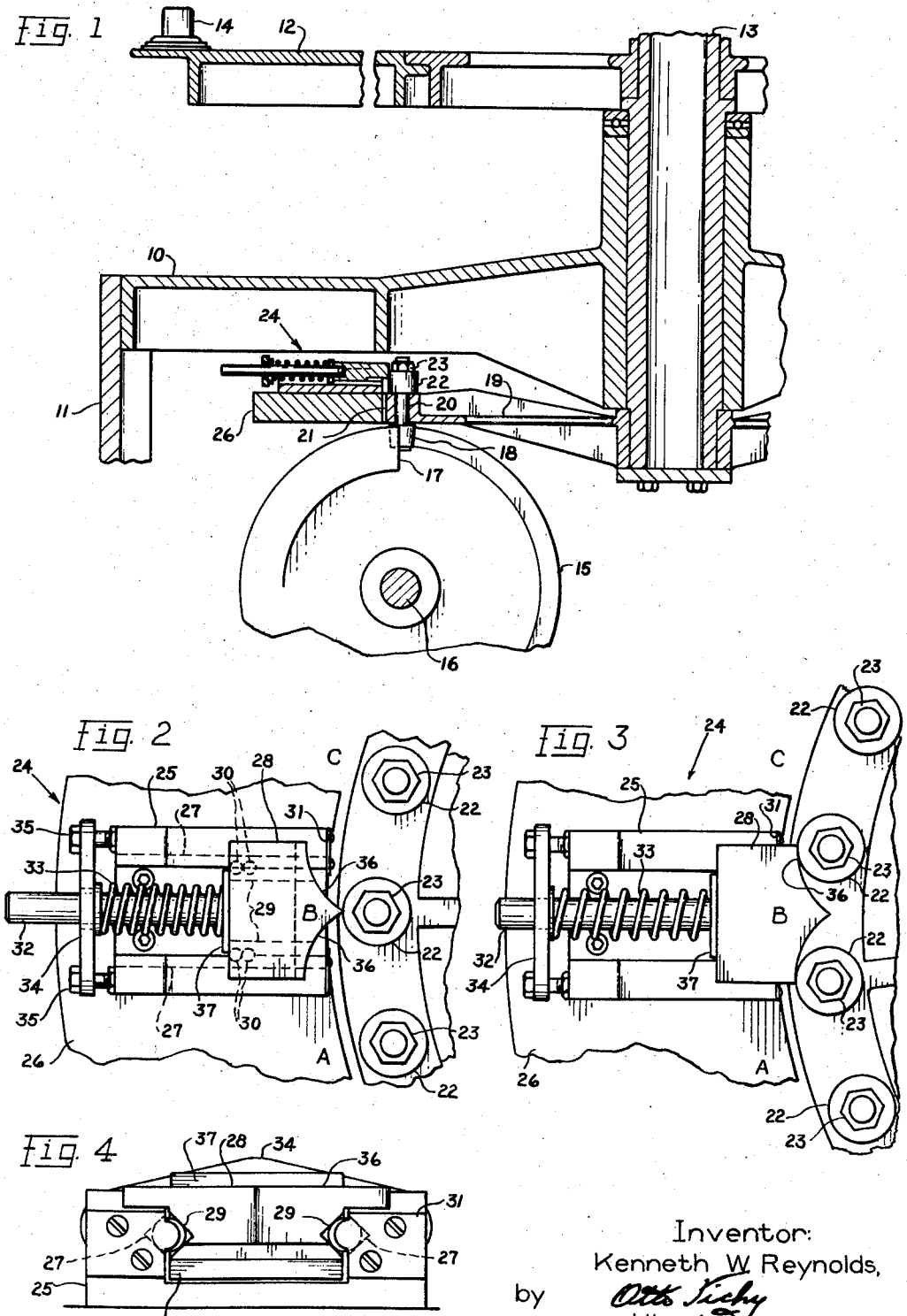
May 26, 1959  K. W. REYNOLDS  2,887,905
ROTARY INDEXING MACHINE
Filed Oct. 3, 1955  3 Sheets-Sheet 1
Inventor:
Kenneth W. Reynolds,
by Otto Tichy
His Attorney May 26, 1959     K. W. REYNOLDS     2,887,905
ROTARY INDEXING MACHINE
Filed Oct. 3, 1955     3 Sheets-Sheet 2
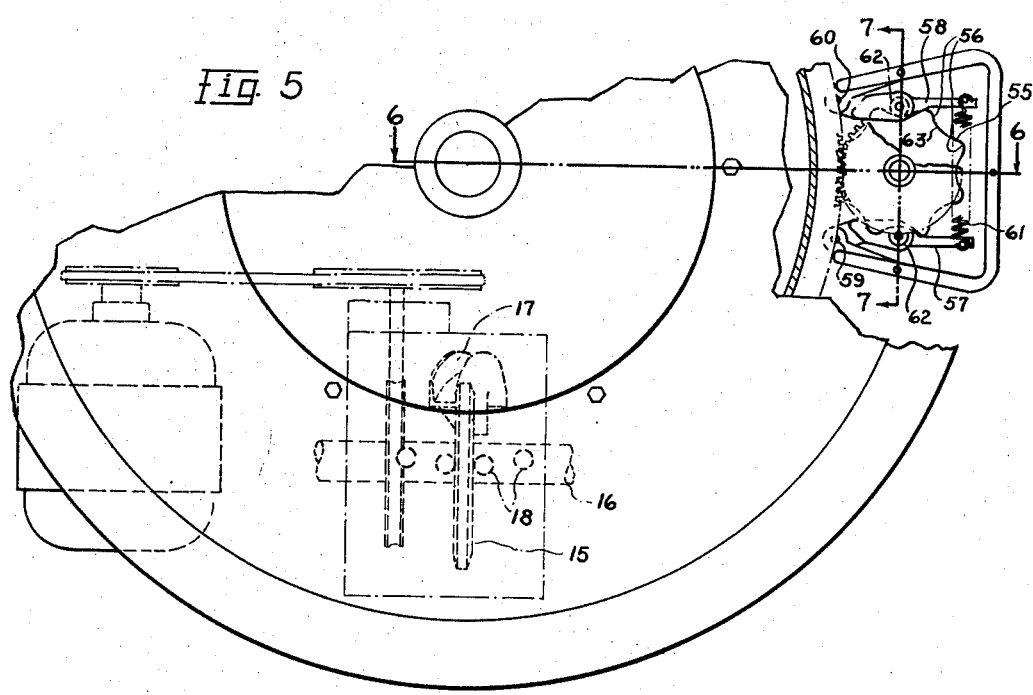
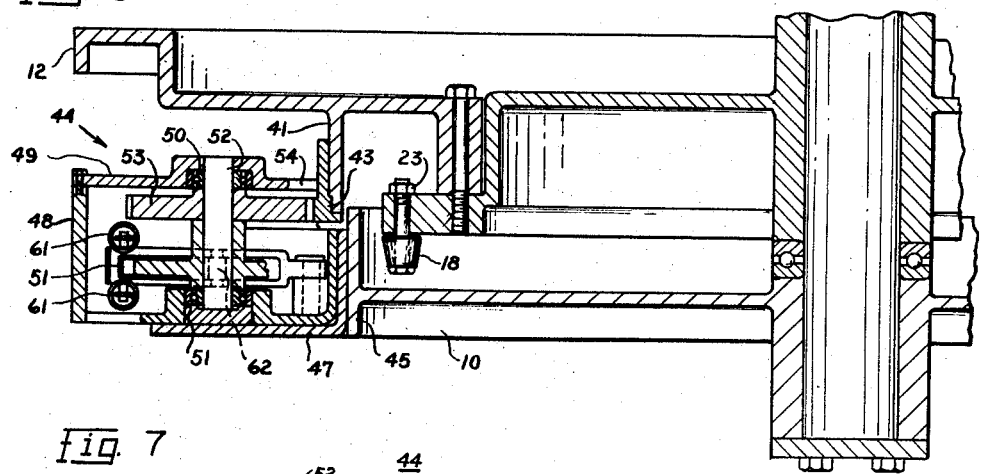
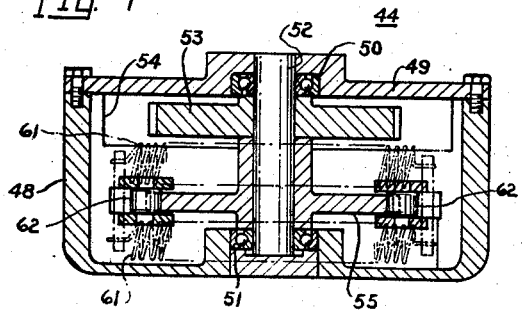
Inventor:
Kenneth W. Reynolds,
by *Otto Finley*
His Attorney

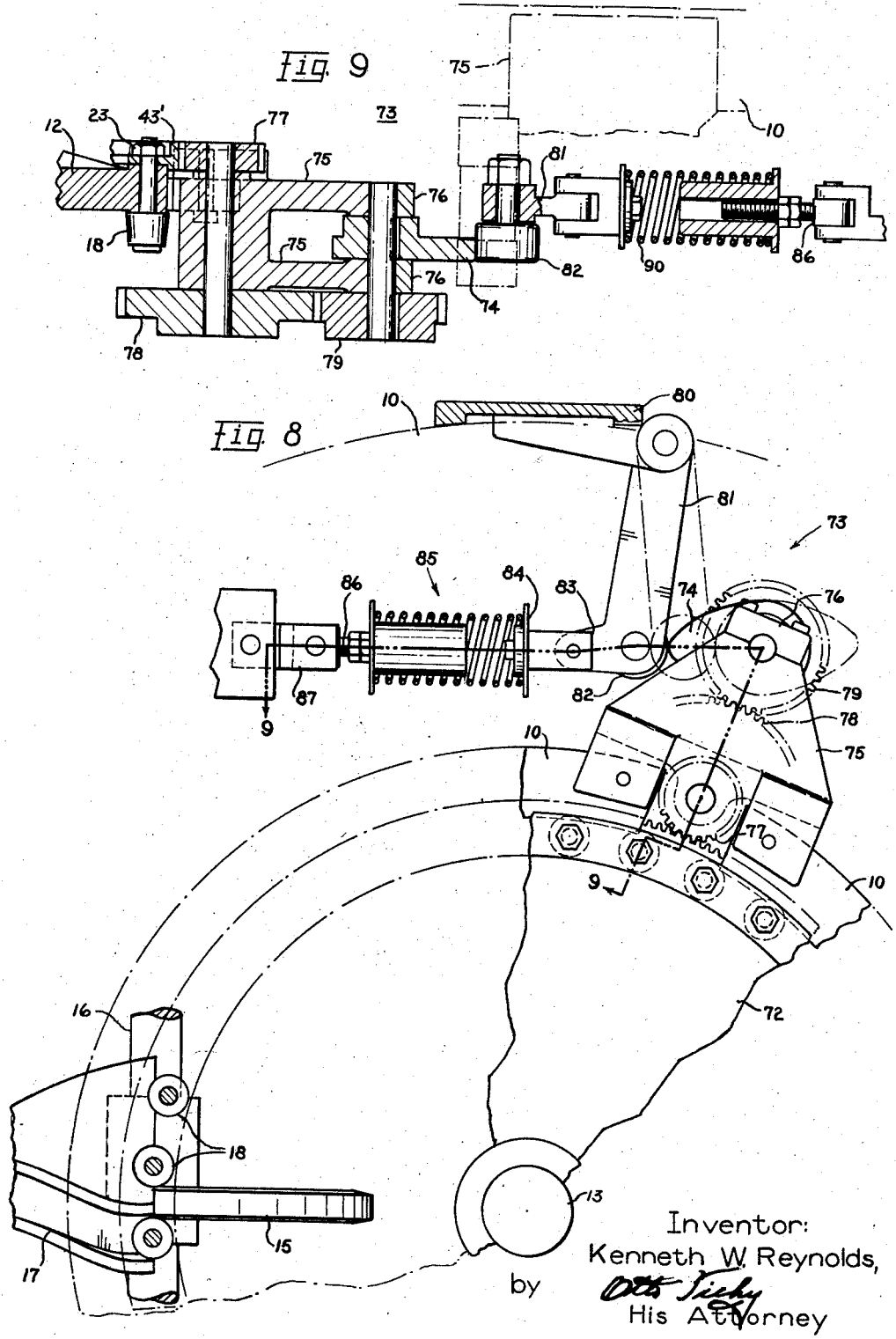

2,887,905

ROTARY INDEXING MACHINE

Kenneth W. Reynolds, Willoughby, Ohio, assignor to General Electric Company, a corporation of New York Application October 3, 1955, Serial No. 538,132

7 Claims. (Cl. 74—821)

My invention relates to machines of the rotary indexing type wherein a turret is mounted for intermittent angular movement about its axis.

The operating cycles of the turret include the indexing portion during which the turret is rotated through a predetermined angle, and the dwell or idle portion during which the turret remains stationary to permit operations to be performed at various stations located at the periphery of the turret. With the development of higher production machines, such as automatic lamp making machinery for example, it has become necessary to speed up operation of the turret and, more particularly, to speed up the indexing portion of the operating cycle inasmuch as the dwell portion is fixed by the time necessary to perform the operations at the various stations. However, such speeding up presents numerous problems with their underlying cause to be found in the law of inertia. Increased sizes of the turrets and increased weight due to additions of various attachments further aggravate the problems involved in faster operation, resulting in wear and fatigue of the indexing cam and roller to the point where lost motion is acquired with resultant chattering and shaking and uneven indexing of the turret. In an attempt to overcome those problems many devices have been employed, including the use of lighter metals in the turret, brakes to absorb the forces of inertia through friction, etc.

It is an object of my invention to provide means for increasing the indexing speed of rotatable turret type machines without the attendant disadvantages referred to above. It is another object to provide for increased indexing speed without additional mechanical stress and also without jarring during starting or stopping of the turret. It is a further object to provide means to permit steeper pressure angles in indexing cams resulting in a decrease in the cam angle devoted to indexing and an attendant increase in the angle devoted to idle or dwell time. It is a still further object to provide apparatus adaptable to existing machines whereby they may be operated at speeds greatly in excess of that for which they were originally designed.

Generally speaking, I have found that the above objectives may be attained by the provision of energy accumulator means which will absorb the energy of moving inertia, store it until needed, and then release it to overcome the forces of static inertia. A machine turret moving at high speed is possessed of a considerable amount of kinetic energy. The energy accumulator absorbs this energy in an energy storage means, such as a spring or a compressible gas, during the decelerating half of the indexing cycle, storing it for use during the accelerating half of the following cycle.

My invention will be better understood from the following description of species thereof taken in conjunction with the accompanying drawings wherein:

Fig. 1 is a sectional elevation of a portion of a turret indexing machine and an energy accumulator mechanism associated therewith in accordance with one embodiment of my invention;

Fig. 2 is a plan view of the energy accumulator mechanism in the "energized" position with the turret in the dwell position;

Fig. 3 is a plan view of the energy accumulator mechanism in the "de-energized" position with the turret midway through the indexing portion of an operating cycle;

Fig. 4 is a front elevational view of the energy accumulator mechanism;

Fig. 5 is a fragmentary plan view of a turret indexing machine in conjunction with a modified form of energy accumulator mechanism;

Fig. 6 is an enlarged partial elevation of the machine on line 6—6 of Fig. 5;

Fig. 7 is an enlarged section on line 7—7 of Fig. 5 of the energy accumulator mechanism with the removed spring elements shown in phantom;

Fig. 8 is a fragmentary plan view of a turret indexing machine in conjunction with still another modified form of energy accumulator; and Fig. 9 is a fragmentary sectional view taken on line 9—9 of Fig. 8.

Referring to Figs. 1 to 4, the apparatus as there shown includes a stationary table 10 supported upon a plurality of circumferentially arranged legs 11, only one of which is shown. A turret or carrier member 12 is rotatably mounted on a vertical shaft 13 journalled in said stationary table 10. The turret 12 supports, at uniformly angular spaced intervals around the periphery thereof, a plurality of article-supporting heads 14, of which only one is shown in Fig. 1.

The turret 12 is intermittently indexed in a counter-clockwise direction to each of a plurality of stations at which are located various mechanisms to perform work upon the article supported by said heads 14. The indexing of the turret may be performed by any conventional indexing mechanism such as a conventional sine type indexing cam. The continuously rotating disc cam 15 is keyed to a horizontal drive shaft 16 which is mounted below the table 10. A segment 17 (see also Fig. 8) of the disc cam is of 90° arcuate extent and spirally grooved to successively engage with a plurality of spindles or rollers 18 corresponding to the number of heads 14 and mounted at uniformly angular spaced intervals around the periphery of a spider 19 which is keyed to the central shaft 13 on the underside of table 10 to move in unison with the turret 12. The actual indexing is effected by the segment 17, and the turret is maintained stationary during its dwell periods by the presence of the disc 15 between a pair of the rollers 18.

The spindles or rollers 18 are carried by a plurality of studs 20, there being one for each spindle 18, which extend vertically through the flat portion 21 of spider 19. Each stud also carries at its upper end a cam-follower roller 22 and is secured in place by a nut 23 threaded at its uppermost end. The cam-follower rollers 22 are mounted in a manner whereby they may engage the operating elements of the energy accumulator 24.

The energy accumulator 24 comprises a frame 25 for attachment to the sub-table 26 adjacent to the spider 19, said frame 25 having a pair of horizontal V grooves 27 to receive a harmonic cam slide 28, said cam slide 28 having a corresponding pair of horizontal V grooves 29. A plurality of steel balls 30 are disposed between the corresponding V grooves of the accumulator frame 25 and the cam slide 28 to reduce the sliding friction to rolling friction. End caps 31, as can be seen in Fig. 4, are provided to retain the steel balls within the V grooves at the forward end of the accumulator while a retaining plate 37 mounted on a push rod 32 is provided to retain the balls 30 at the rearward end.

The surfaces 36 of the cam 28 are cut according to the constant acceleration formula referred to the center of the turret rollers with increments on the turret radii.

The cam slide 28 is actuated by means of the push rod 32 which is normally urged inwardly toward the spider 19 by means of the helical spring 33. The harmonic cam slide 28 is adapted to bear against the rollers 22 of the spider 19 so as to impart a reciprocating motion to the push rod 32 as the spider and turret revolve. A yoke 34 is provided at the outward end of the accumulator frame to support the push rod 32 and to serve as a method of adjusting the compression of the spring by means of a pair of adjustable screws 35. The parts are so arranged that the spring 33 is always held stressed and is never allowed to expend all of its energy.

In operation, as seen in Fig. 2, during a stationary or idle period of the turret a cam-follower roller 22 is at station "B" in axial alignment with the cam slide 28 of the accumulator 24, said cam slide 28 being in a compressed position. As the indexing cam 15 advances the roller 22 slightly past the idle position, the consequent action of the accumulator spring 33 is to cause the cam slide 28 to exert pressure on the roller 22 in such a manner as to assist in accelerating the turret from one station "B" to the next "A." This acceleration continues until the mid point of the index cycle. At this point, as can be seen in Fig. 3, the next subsequent roller, the one previously at station "C," contacts the accumulator slide cam 28.

As the index cycle continues, this roller 22 follows the contour 36 of the cam portion of the cam slide 28 causing said cam slide 28 to retract and compress the accumulator spring 33 at the same instance absorbing any jar caused by stopping the rotation of the turret 12. At the completion of each such index of the turret, the cam slide 28 is retracted to its energized position in contact with the next subsequent roller 22 following the one from which it was previously disengaged. Thus the indexing cam 15 and the energy accumulator 24 are in a position to repeat the operations of the next indexing cycle.

Although a single energy accumulator has been shown, for optimum efficiency it has been found desirable to supply a plurality of accumulators so that the average spring pressure adequately compensates for the inertia of the turret.

Referring to the modification shown in Figs. 5 to 7, a conventional indexing cam 15 is provided such as in the first embodiment described. Secured to an annular skirt 41 extending downwardly from the turret 12 is a ring gear 43, replacing the cam-follower rollers of the first embodiment, mounted in a manner whereby it may engage the operating elements of the energy accumulator 44.

Secured to the side flange 45 of the stationary table 10 is a support 47 for the energy accumulator housing 48 having a cover plate 49. Hub portions on the cover plate and housing are bored to receive axially aligned ball bearings 50 and 51, respectively, in which is journalled a vertically extending shaft 52. Fixed to the shaft 52 for operative engagement with the ring gear 43 is a pinion gear 53 which revolves said shaft 52 as the turret 42 rotates. There is an opening 54 in the side of the housing so that the pinion gear 53 may engage with the ring gear 43. Also fixed to said shaft 52 is a multiple sine wave cam 55 having a plurality (even in number) of identical lobes or peaks 56 to actuate a pair of rocker arms 57 and 58 which are pivoted at 59 and 60, respectively. Intermediate the other extreme ends of said rocker arms 57 and 58 are mounted a pair of tension springs 61 which normally tend to pivot the rocker arms 57 and 58 toward each other.

As viewed in Fig. 5, the operating elements are in an intermediate position of the indexing cycle of the turret. The rollers 62 of the rocker arms 57 and 58 are in a diametrically opposed pair of valleys 63 of the cam 55.

Rotation of the turret 12 during the second half of the indexing cycle will revolve the shaft 52 causing the cam 55 to rotate so that the rollers 62 will move from the low points or valleys 63 of the cam 55 to the high points or lobes 56 of said cam 55. During this period of movement the cam 55 causes the rocker arms 57 and 58 to spread and thus place the spring 61 in tension. Energy is thereby stored in the spring 61 to assist the indexing cam 15 in driving the turret during the first half of the next subsequent indexing cycle.

A third embodiment of the invention, as shown in Figs. 8 and 9, utilizes a conventional indexing cam 15 and a ring gear 43' mounted on the turret or turntable 12 similar to that of the embodiment shown in Figs. 5 to 7.

The energy accumulator proper 73 is provided with a single lobed cam 74, journalled in a bracket 75 with bearing caps 76 and secured to the stationary table 10 of the turret 72. The cam 74 is driven by ring gear 43' through a train of gears 77, 78 and 79 also journalled in bracket 75. The said gear train is so proportioned that the cam 74 makes one revolution during an index cycle of the turret 12 from one station to the next subsequent station. Journalled in bracket 80, which is secured to another portion of stationary table 10, is a lever 81 which carries a roller 82 to engage with said cam 74. Connected to the free end 83 of lever 81 is an end cap 84 of a spring housing structure 85, which housing is pivotably mounted at its opposite end 86 to a bracket 87 secured to stationary table 10. The spring housing is adapted to receive a spring 90 tending to force the lever roller 82 to bear against cam 74 to receive energy therefrom and return energy thereto.

The energized position of the energy accumulator is indicated in Fig. 8 in solid lines while the de-energized position or midpoint of the index cycle is indicated in broken lines.

Rotation of the cam in a counterclockwise direction will cause the lever roller 82 to move to a high point on the cam as seen in Fig. 8. During this period of movement the lever forces the spring to compress, at the same instance absorbing any jar caused by stopping the rotation of the turret. Thus the spring is in an energized position ready to return the energy to the cam and to assist in driving the turret during the first half of the next subsequent index cycle.

From the foregoing it will be noted that the energy stored in the spring of the accumulator is expended during the first half of the index cycle to assist in accelerating the turret, while during the decelerating or final portion of the index cycle the spring acts as an effective braking aid to the indexing cam.

Although I have shown and described certain embodiments of my invention, it will be apparent to those skilled in the art that various changes and modifications may be made without departing from the invention, and I therefore aim in the appended claims to cover all such changes and modifications as fall within the true spirit and scope of the invention.

What I claim as new and desire to secure by Letters Patent of the United States is:

1. In a machine of the rotary indexing type, the combination of a turret mounted for rotation about its axis, indexing means for intermittently advancing said turret about its axis in the same direction in successive operating cycles including an indexing portion during which the turret is rotated through a predetermined angle and a dwell portion during which the turret is held stationary, and energy accumulator mechanism comprising energy storage means, means operatively connecting said energy storage means directly with said turret independently of said indexing means to alternately absorb kinetic energy resulting from movement of the turret during the latter part of the indexing portion of each operating cycle, to maintain the said energy storage means energized during the dwell portion of the cycle and to release said energy to the turret during the early part of the indexing portion of the next succeeding operating cycle.

2. In a machine of the rotary indexing type, the combination of a turret mounted for rotation about its axis, indexing means for intermittently advancing said turret about its axis in the same direction in successive operating cycles including an indexing portion during which the turret is rotated through a predetermined angle and a dwell portion during which the turret is held stationary, and energy accumulator mechanism comprising energy storage spring means, cam means, means operatively connecting said spring means to be energized and de-energized by said cam means, and means operatively connecting said cam means directly with said turret independently of said indexing means to be actuated by said turret, said cam means being configurated to alternately cause energization of said spring means to absorb kinetic energy resulting from movement of the turret during the latter part of the indexing portion of each operating cycle, to maintain the said spring means energized during the dwell portion of the cycle and to cause release of said energy to the turret during the early part of the indexing portion of the next succeeding operating cycle.

3. In a machine of the rotary indexing type, the combination of a turret mounted for rotation about its axis, indexing means for intermittently advancing the turret about its axis in the same direction in successive operating cycles including an indexing portion during which the turret is rotated through a predetermined angle and a dwell portion during which the turret is held stationary, a plurality of rollers uniformly spaced around the periphery of said turret and corresponding in number to the number of operating cycles, and energy accumulator mechanism comprising a cam member mounted adjacent the periphery of said turret for reciprocation upon engagement with successive ones of said rollers, and spring means arranged to be energized by said cam member, said cam member being shaped to cause the cam member to be actuated in a direction to energize said spring means upon engagement of a roller therewith to aid in decelerating the turret during the last half of an indexing portion of an operating cycle, to maintain the spring means energized during the dwell portion of the cycle, and to release the energy stored in said spring means to aid in accelerating the turret during the first half of the indexing portion of the following operating cycle.

4. In a machine of the rotary indexing type, the combination of a turret mounted for rotation about its axis, indexing means for intermittently advancing the turret about its axis in the same direction in successive operating cycles including an indexing portion during which the turret is rotated through a predetermined angle and a dwell portion during which the turret is held stationary, an energy accumulator mechanism comprising rotatable cam means, accumulator spring means, means operatively connecting said spring means to be energized and de-energized by said cam means, and means connecting said cam means to be rotated directly from said turret independently of said indexing means, said cam means being configurated to effect energization of the spring means to aid in decelerating the turret during the last half of the indexing portion of each operating cycle, to maintain the said spring means energized during the dwell portion of the cycle and to release the energy stored in said spring means to aid in accelerating the turret during the first half of the indexing portion of the following operating cycle.

5. In a machine of the rotary indexing type, the combination of a turret mounted for rotation about its axis, indexing means for intermittently advancing the turret about its axis in the same direction in successive operating cycles including an indexing portion during which the turret is rotated through a predetermined angle and a dwell portion during which the turret is held stationary, an energy accumulator mechanism comprising a rotatable multiple sine wave cam, rollers engaging diametrically opposed like portions of said cam, accumulator spring means operatively connected to said rollers to be fully energized when the rollers are in engagement with the peaks of a pair of sine waves and to be de-energized when the rollers are in engagement with the valleys of the sine waves, and means connecting said cam to be rotated directly from said turret independently of said indexing means, said cam being so arranged that the peaks of the sine wave surfaces are in engagement with said rollers during the dwell portion of each indexing cycle.

6. In a machine of the rotary indexing type, the combination of a turret mounted for rotation about its axis, indexing means for intermittently advancing the turret about its axis in the same direction in successive operating cycles including an indexing portion during which the turret is rotated through a predetermined angle and a dwell portion during which the turret is held stationary, an energy accumulator mechanism comprising a rotatable single lobed cam, accumulator spring means, means operatively connecting said spring means to be energized and de-energized by said cam means, and means connecting said cam means with said turret independently of the indexing means to be rotated through one revolution during each operating cycle, said cam being arranged to effect energization of the spring means to aid decelerating the turret during the last half of the indexing portion of each operating cycle, to maintain the spring means energized during the dwell portion of the cycle and to release the energy stored in the spring means to aid in accelerating the turret during the first half of the indexing portion of the following operating cycle.

7. In a machine of the rotary indexing type, the combination of a turret mounted for rotation about its axis, indexing means for intermittently advancing the turret about its axis in the same direction in successive operating cycles including an indexing portion during which the turret is rotated through a predetermined angle and a dwell portion during which the turret is held stationary, energy accumulator mechanism mounted adjacent the periphery of the turret and comprising an accumulator spring member, actuating members uniformly spaced around the periphery of the turret and corresponding in number to the number of said operating cycles, means mounting said accumulator spring member to be energized by engagement with said actuating members to aid in decelerating the turret during the latter part of the indexing portion of each operating cycle, to maintain the spring member energized during the dwell portion of the cycle and to accelerate the turret during the early part of the indexing portion of the following operating cycle.

References Cited in the file of this patent

UNITED STATES PATENTS

| | | |
|---|---|---|
| 1,404,183 | Augustine | Jan. 24, 1922 |
| 2,021,639 | Robinson | Nov. 19, 1935 |
| 2,217,596 | Munschauer | Oct. 8, 1940 |
| 2,602,473 | Dalle | July 8, 1952 |

FOREIGN PATENTS

| | | |
|---|---|---|
| 164,389 | Germany | Oct. 30, 1905 |
| 272,435 | Italy | Mar. 10, 1930 |

OTHER REFERENCES

Standard Tool and Mfg. Co., Bulletin No. 12, Mar. 12, 1953.